(12) United States Patent
Zhang

(10) Patent No.: US 8,596,073 B2
(45) Date of Patent: Dec. 3, 2013

(54) HEAT PIPE FOR REMOVING THERMAL ENERGY FROM EXHAUST GAS

(75) Inventor: Hua Zhang, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/175,966

(22) Filed: Jul. 18, 2008

(65) Prior Publication Data

US 2010/0011738 A1  Jan. 21, 2010

(51) Int. Cl.
*F02C 1/00* (2006.01)

(52) U.S. Cl.
USPC .............................. 60/772; 60/39.5

(58) Field of Classification Search
USPC .................. 60/39.5, 39.12, 39.511, 772
See application file for complete search history.

(56) References Cited

U.S. PATENT DOCUMENTS

| | | | |
|---|---|---|---|
| 3,517,730 A * | 6/1970 | Wyatt | 165/272 |
| 3,722,797 A | 3/1973 | Hammill | |
| 3,852,805 A * | 12/1974 | Brzozowski | 257/715 |
| 4,033,406 A | 7/1977 | Basiulis | |
| 4,036,290 A | 7/1977 | Kelly | |
| 4,149,588 A | 4/1979 | Waters | |
| 4,226,282 A | 10/1980 | Kunsagi et al. | |
| 4,234,782 A | 11/1980 | Barabas et al. | |
| 4,280,554 A | 7/1981 | Stockman | |
| 4,372,110 A | 2/1983 | Cheng | |
| 4,426,959 A | 1/1984 | McCurley | |
| 4,567,857 A | 2/1986 | Houseman et al. | |
| 4,570,466 A | 2/1986 | Matthews | |
| 4,621,681 A | 11/1986 | Grover | |
| 4,932,204 A | 6/1990 | Pavel et al. | |
| 5,233,934 A | 8/1993 | Krigmont et al. | |
| 5,237,939 A | 8/1993 | Spokoyny et al. | |
| 5,248,252 A | 9/1993 | Delichatsios et al. | |
| 5,311,930 A | 5/1994 | Bruenn | |
| 5,632,143 A | 5/1997 | Fisher et al. | |
| 5,845,481 A | 12/1998 | Briesch et al. | |

(Continued)

FOREIGN PATENT DOCUMENTS

| | | |
|---|---|---|
| CN | 2110932 U | 7/1992 |
| CN | 101187346 A | 5/2008 |

(Continued)

OTHER PUBLICATIONS

Search Report from CN Application No. 2009101616151 dated Feb. 26, 2013.

(Continued)

*Primary Examiner* — Phutthiwat Wongwian
(74) *Attorney, Agent, or Firm* — Cantor Colburn LLP

(57) ABSTRACT

Disclosed is a turbomachine including at least one exhaust pathway along which exhaust is directed and released, and at least one exhaust processor capable of removing regulated substances from the exhaust. A plurality of heat pipes are disposed at least partially in the exhaust pathway upstream of the at least one exhaust processor. The plurality of heat pipes are capable of transferring thermal energy from the exhaust to the plurality of heat pipes thus reducing a temperature of the exhaust to increase effectiveness of the at least one exhaust processor. A method for releasing turbomachine exhaust includes urging turbomachine exhaust along at least one exhaust pathway and flowing the exhaust past a plurality of heat pipes. Thermal energy is transferred from the exhaust to the plurality of heat pipes thus reducing a temperature of the exhaust.

19 Claims, 4 Drawing Sheets

(56) References Cited

U.S. PATENT DOCUMENTS

| | | | |
|---|---|---|---|
| 5,918,555 A * | 7/1999 | Winegar | 110/345 |
| 6,041,588 A | 3/2000 | Bruckner et al. | |
| 6,065,280 A | 5/2000 | Ranasinghe et al. | |
| 6,132,823 A | 10/2000 | Qu | |
| 6,241,009 B1 | 6/2001 | Rush | |
| 6,397,575 B2 | 6/2002 | Tomlinson et al. | |
| 6,782,703 B2 | 8/2004 | Dovali-Solis | |
| 6,866,092 B1 | 3/2005 | Molivadas | |
| 6,874,322 B2 | 4/2005 | Schwarzott | |
| 6,916,430 B1 | 7/2005 | Qu | |
| 6,962,051 B2 | 11/2005 | Radcliff | |
| 7,069,716 B1 | 7/2006 | Childers | |
| 7,131,294 B2 | 11/2006 | Manole | |
| 7,382,047 B2 * | 6/2008 | Chen et al. | 257/706 |
| 7,621,720 B2 | 11/2009 | Nies | |
| 7,730,727 B2 | 6/2010 | Yuan et al. | |
| 2003/0182944 A1 | 10/2003 | Hoffman et al. | |
| 2004/0045294 A1 | 3/2004 | Kobayashi et al. | |
| 2006/0083626 A1 | 4/2006 | Manole | |
| 2006/0231235 A1 | 10/2006 | Yamanaka et al. | |
| 2007/0017207 A1 | 1/2007 | Smith et al. | |
| 2007/0068167 A1 | 3/2007 | Patel et al. | |
| 2007/0074515 A1 | 4/2007 | Yoshino | |
| 2007/0234704 A1 | 10/2007 | Moniz et al. | |
| 2008/0115923 A1 * | 5/2008 | Yamanaka et al. | 165/276 |
| 2008/0164009 A1 | 7/2008 | Chong | |
| 2008/0290567 A1 | 11/2008 | Thillen et al. | |
| 2008/0304954 A1 | 12/2008 | Hoffman et al. | |
| 2010/0024382 A1 | 2/2010 | Zhang et al. | |
| 2010/0089062 A1 | 4/2010 | Cao | |

FOREIGN PATENT DOCUMENTS

| | | |
|---|---|---|
| DE | 294483 | 4/1915 |
| EP | 0794401 A3 | 9/1997 |
| GB | 2099126 A | 12/1982 |
| JP | 2005069161 A | 3/2005 |

OTHER PUBLICATIONS

EP Search Report for EP Application No. EP09173330. Dated Nov. 25, 2010.

Office Action from JP Application No. 2009-166228 dated Jun. 25, 2013.

EP Search Report for Application No. EP 09 16 5813; Search Report dated Nov. 18, 2009.

* cited by examiner

HEAT PIPE FOR REMOVING THERMAL ENERGY FROM EXHAUST GAS

BACKGROUND

The subject invention relates to turbomachinery. More particularly the subject invention relates to cooling of exhaust gas of turbomachinery.

Exhaust gas from turbomachinery, for example a gas turbine power generation plant, often must meet stringent regulatory requirements for composition of the exhaust gas released into the atmosphere. One of the components typically found in exhaust gas and subject to regulation is $NO_x$. To remove the $NO_x$ from the exhaust stream, technology such as Selective Catalytic Reduction (SCR) is often utilized. In an SCR process, ammonia ($NH_3$) or the like reacts with $NO_x$ and produces nitrogen ($N_2$) and water ($H_2O$). Effectiveness of the SCR process depends on the temperature of the exhaust gas which is processed. Exhaust gas from the turbomachinery is often about 1100 degrees F., and must be cooled prior to SCR to increase the effectiveness of SCR to meet requirements. This cooling is typically achieved by diluting the exhaust gas with cooler ambient air urged into the exhaust gas stream by large fan systems. These fan systems must be capable of high flow rates and high pressures thus increasing the complexity and cost of operating the turbomachinery.

BRIEF DESCRIPTION OF THE INVENTION

According to one aspect of the invention, a turbomachine includes at least one exhaust pathway along which exhaust is directed and released, and at least one exhaust processor capable of removing regulated substances from the exhaust. A plurality of heat pipes are disposed at least partially in the exhaust pathway upstream of the at least one exhaust processor. The plurality of heat pipes are capable of transferring thermal energy from the exhaust to the plurality of heat pipes thus reducing a temperature of the exhaust to increase effectiveness of the at least one exhaust processor.

According to another aspect of the invention, a method for releasing turbomachine exhaust includes urging turbomachine exhaust along at least one exhaust pathway and flowing the exhaust past a plurality of heat pipes. Thermal energy is transferred from the exhaust to the plurality of heat pipes thus reducing a temperature of the exhaust. The exhaust is flowed through at least one exhaust processor to remove regulated substances from the exhaust before dispensing the exhaust.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
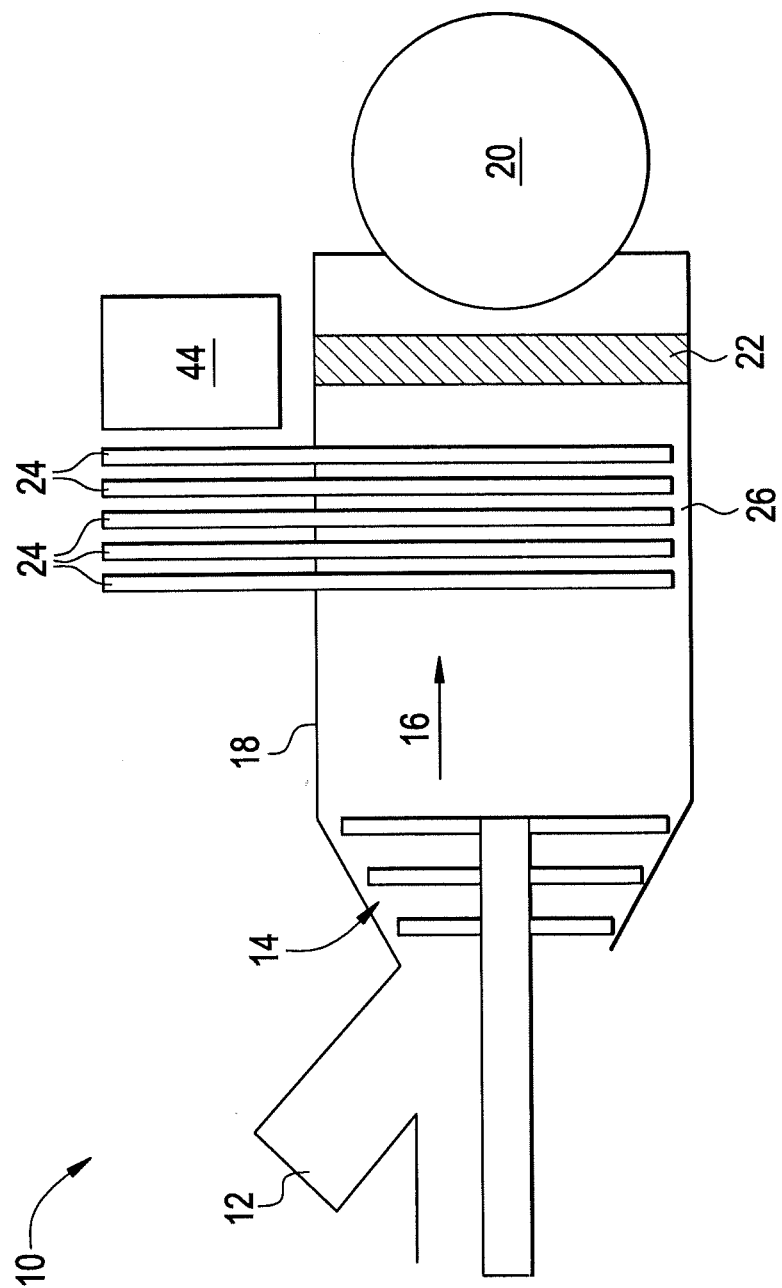
FIG. 1 is a schematic view of an embodiment of an exhaust apparatus for a turbomachine.

Shown in FIG. 1 is a schematic illustration of an embodiment of a turbomachine, for example, a gas turbine 10. The gas turbine 10 includes one or more combustors 12 in which fuel and compressed air are mixed and ignited. The hot gas product of the combustion flows to a turbine 14 which extracts work from the hot gas. After flowing through the turbine 14, the hot gas or exhaust 16, flows through an exhaust duct 18 toward a stack 20 for release into atmosphere.

To reduce an amount of $NO_x$ released into the atmosphere from the stack 20, the exhaust 16 is urged through an exhaust processor, in some embodiments a Selective Catalytic Reduction (SCR) system 22, prior to release into the atmosphere. As shown in FIG. 1, the SCR system 22 is, in some embodiments, disposed between the exhaust duct 18 and the stack 20. It is to be appreciated, however, that the SCR system 22 may be disposed in other locations, for example, in the exhaust duct 18 or in the stack 20. Further, the embodiments are not limited to the use of one SCR system 22, but multiple SCR systems 22 may be included. The SCR system 22 includes a quantity of a catalyst, and an ammonia ($NH_3$) injection grid. In the catalyst, the $NH_3$ reacts with $NO_x$ in the exhaust 16 and produces nitrogen ($N_2$) and water ($H_2O$) thereby removing regulated $NO_x$ from the exhaust 16 prior to releasing the exhaust 16 into the atmosphere.

Figure 2:
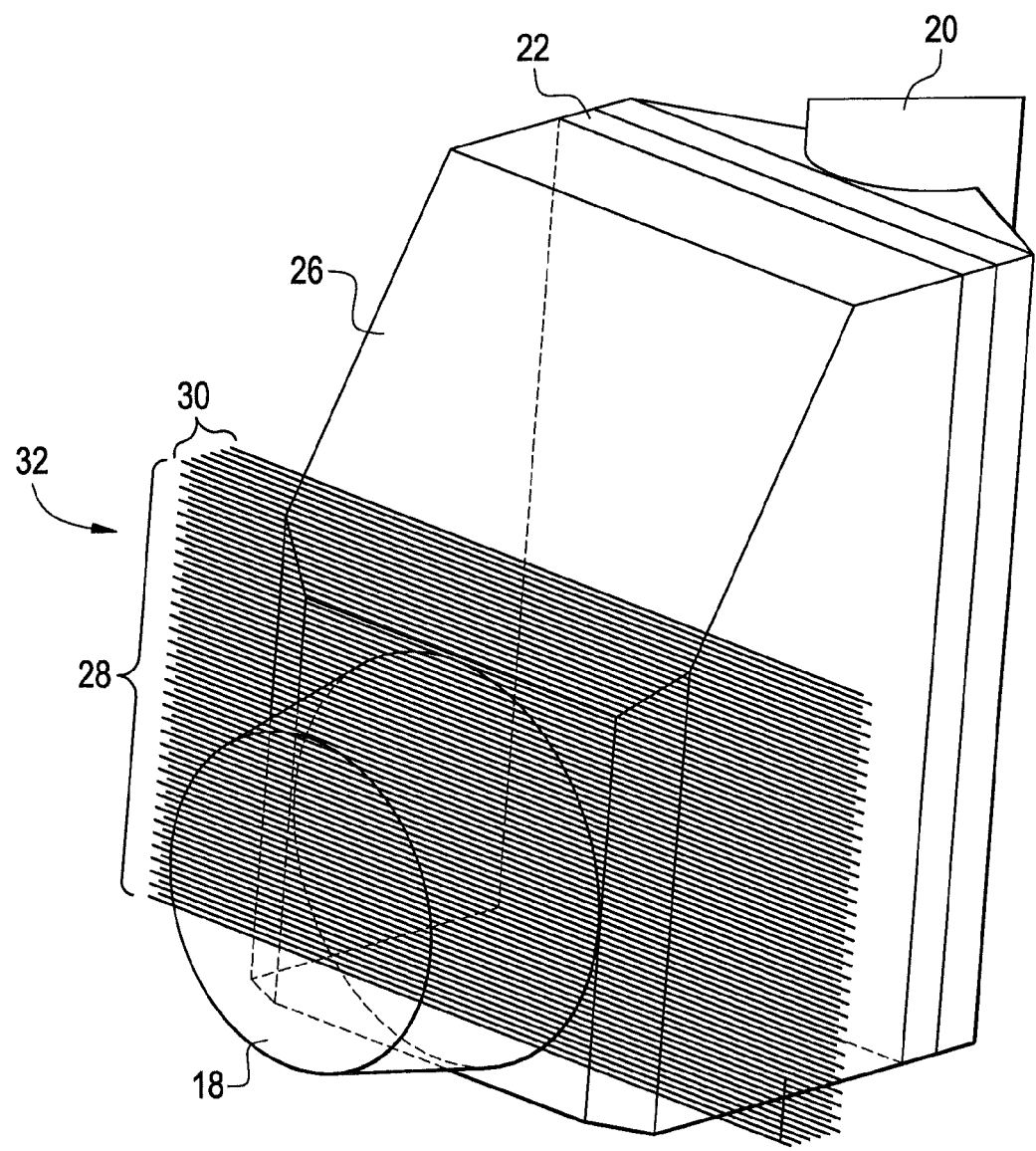
FIG. 2 is a partial perspective view of the exhaust apparatus of FIG. 1.
Figure 3:
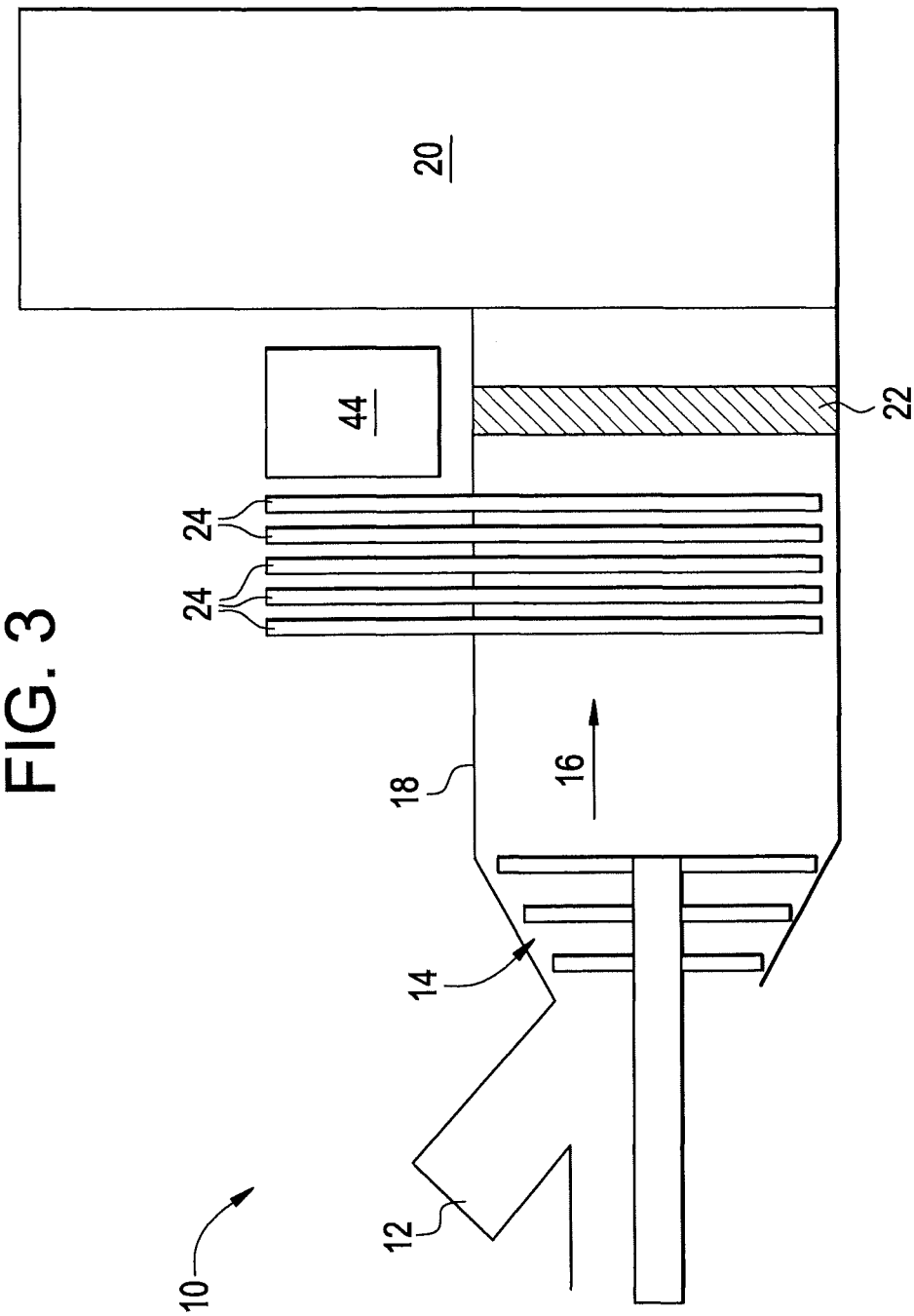
FIG. 3 is a schematic view of another embodiment of an exhaust apparatus for a turbomachine.

A plurality of heat pipes 24 extends at least partially into the exhaust 16 upstream of the SCR system 22. In the embodiment of FIG. 1, the plurality of heat pipes 24 is disposed in an SCR duct 26 between the exhaust duct 18 and the SCR system 22. As best shown in FIG. 2, each heat pipe 24 of the plurality of heat pipes 24 extends substantially horizontally through SCR duct 26 in a plurality of rows 28 and columns 30 forming an array 32. It is to be appreciated, however, that the plurality of heat pipes 24 may be arranged in other configurations, for example, extending vertically through the SCR duct 26 as shown in FIG. 3. Further, more than one array 32 of heat pipes 24 may extend through the exhaust 16.

Figure 4:
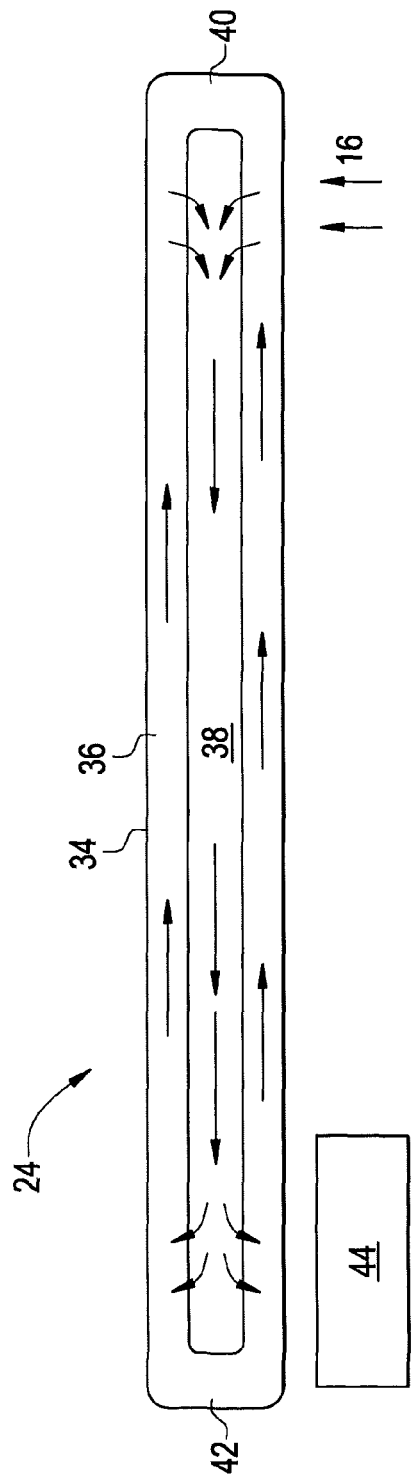
FIG. 4 is a cross-sectional view of an embodiment of a heat pipe of the exhaust apparatus of FIG. 1 or FIG. 2.

Each heat pipe 24 is configured and disposed to remove thermal energy from the exhaust 16 and dissipate the thermal energy to ambient. A cross-sectional view of a heat pipe 24 is shown in FIG. 4. The heat pipe includes a casing 34 defining an outer surface of the heat pipe 24. Disposed inboard of the casing 34 is an absorbent wick 36, which surrounds a vapor cavity 38. A fluid, such as water, sodium, or other materials, is disposed in the vapor cavity 38. A high temperature end 40 of the heat pipe 24 is disposed such that the exhaust 16 flows across the high temperature end 40, while a low temperature end 42 is disposed outside of the exhaust 16. At the high temperature end 40, thermal energy from the exhaust 16 is transferred to the heat pipe 24 causing fluid in the wick 36 at the high temperature end 40 to evaporate into vapor into the vapor cavity 38. The vapor migrates to the low temperature end 42 along the vapor cavity 38. The vapor condenses in the low temperature end 42 and is absorbed by the wick 36 releasing the thermal energy. The thermal energy is dissipated to ambient by one or more fans 44 disposed at the low temperature end 42 which urge air across the low temperature end 42. The fluid migrates via the wick 36 to the high temperature end 40.

Figure 5:
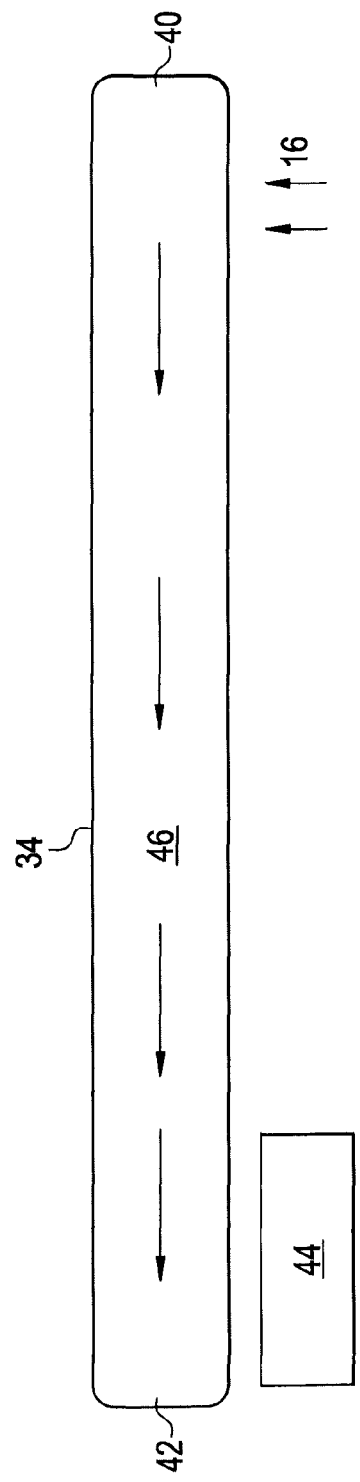
FIG. 5 is a cross-sectional view of another embodiment of a heat pipe of the exhaust apparatus of FIG. 1 or FIG. 2.

In some embodiments, as shown in FIG. 5, each heat pipe 24 is a solid state heat pipe in which thermal energy of the exhaust 16 is absorbed by a highly thermally conductive solid medium 46 disposed in the cavity 38. Thermal energy migrates via the solid medium 46 from the high temperature end 40 to the low temperature end 42 and is dissipated to ambient by the one or more fans 44.

In some embodiments, a temperature of the exhaust 16 entering the exhaust duct 18 from the gas turbine 10 is approximately 1000-1200 degrees F. The heat pipe array 32 is configured to lower the temperature of the exhaust 16 to 800-900 degrees F. before the exhaust 16 enters the SCR system 22. Reducing the temperature of the exhaust 16 to that range increases the effectiveness of the SCR system 22 in removing $NO_x$ from the exhaust before releasing the exhaust 16 through the stack 20. Further, cooling the exhaust 16 via the array 32 of heat pipes 24 provides exhaust 16 which is uniform in temperature and velocity to the SCR system 22 for greater efficiency of the SCR system 22.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbomachine comprising:
at least one exhaust pathway within an exhaust duct of the turbomachine along which exhaust is directed and released;
at least one exhaust processor capable of removing regulated substances from the exhaust;
a plurality of heat pipes having first portions disposed at least partially in the exhaust pathway upstream of the at least one exhaust processor and second portions outside of the exhaust duct, the plurality of heat pipes capable of transferring thermal energy from the exhaust to the plurality of heat pipes via a phase change of a fluid enclosed within at least one heat pipe of the plurality of heat pipes thus reducing a temperature of the exhaust to increase effectiveness of the at least one exhaust processor;
at least one fan that dissipates thermal energy from the second portions of the heat pipes using ambient air.

2. The turbomachine of claim 1 wherein the at least one exhaust processor is at least one selective catalytic reactor.

3. The turbomachine of claim 2 wherein the at least one selective catalytic reactor removes $NO_x$ from the exhaust.

4. The turbomachine of claim 1 wherein the plurality of heat pipes extend substantially horizontally into the exhaust.

5. The turbomachine of claim 1 wherein at least one heat pipe of the plurality of heat pipes comprises:
a volume of fluid disposed in a vapor cavity; and
a wick capable of absorbing fluid in the vapor cavity, the thermal energy of the exhaust transferred to the heat pipe by evaporating fluid in the wick to the vapor cavity.

6. The turbomachine of claim 5 wherein the fluid comprises water.

7. The turbomachine of claim 5 wherein the fluid comprises sodium.

8. The turbomachine of claim 1 wherein at least one heat pipe of the plurality of heat pipes comprises a highly thermally conductive solid medium, thermal energy of the exhaust transferred to the heat pipe via the highly thermally conductive solid medium.

9. The turbomachine of claim 1 wherein the plurality of heat pipes are capable of reducing the temperature of the exhaust to about 800-900 degrees F.

10. A method for releasing turbomachine exhaust comprising:
flowing the exhaust along at least one exhaust pathway within an exhaust duct of the turbomachine;
flowing the exhaust past first portions of a plurality of heat pipes;
transferring thermal energy from the exhaust to the plurality of heat pipes via a phase change of a fluid enclosed within at least one heat pipe of the plurality of heat pipes thus reducing a temperature of the exhaust;
flowing the exhaust through at least one exhaust processor;
removing regulated substances from the exhaust via the at least one exhaust processor;
dispensing the exhaust; and
flowing ambient air across second portions of the plurality of heat pipes outside of the exhaust duct thereby dissipating thermal energy from the plurality of heat pipes.

11. The method of claim 10 including transferring thermal energy from the exhaust by evaporating liquid contained in a wick of at least one heat pipe of the plurality of heat pipes into a vapor cavity of the at least one heat pipe of the plurality of heat pipes.

12. The method of claim 11 including flowing the evaporated liquid from a high temperature end of the at least one heat pipe to a low temperature end of the at least one heat pipe.

13. The method of claim 12 including condensing the evaporated liquid into the wick of the at least one heat pipe.

14. The method of claim 10 including transferring thermal energy from the exhaust to a highly thermally conductive solid medium disposed in at least one heat pipe of the plurality of heat pipes.

15. The method of claim 14 including migrating thermal energy from a high temperature end of the at least one heat pipe to a low temperature end of the at least one heat pipe via the highly thermally conductive solid medium.

16. The method of claim 10 including flowing ambient air across the plurality of heat pipes thereby dissipating thermal energy from the plurality of heat pipes.

17. The method of claim 10 wherein removing the regulated substances from the exhaust is accomplished via at least one selective catalytic reactor.

18. The method of claim 10 wherein the regulated substances include $NO_x$.

19. The method of claim 10 wherein transferring thermal energy from the exhaust to the plurality of heat pipes reduces a temperature of the exhaust to about 800-900 degrees F.

* * * * *